Patented Mar. 23, 1937

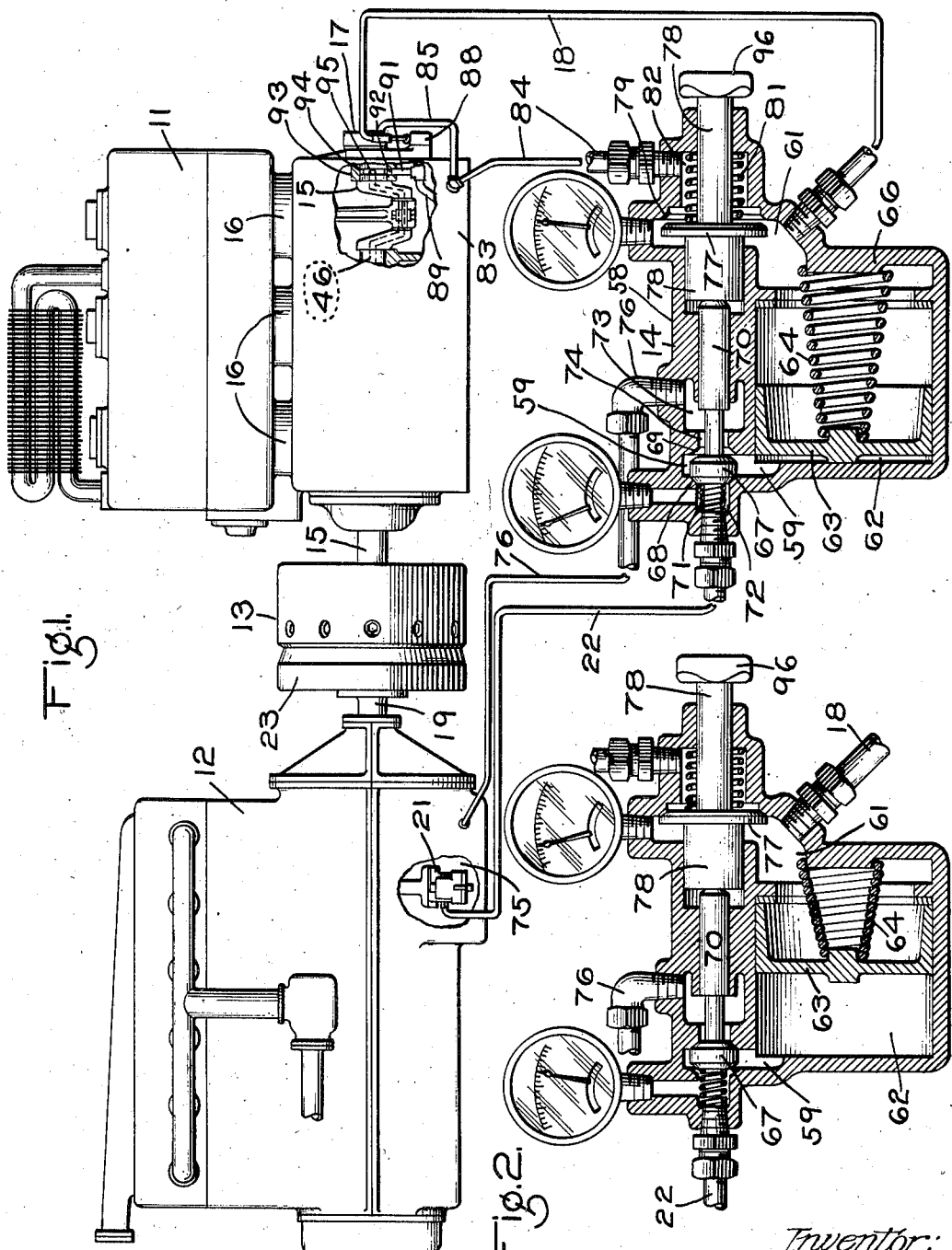

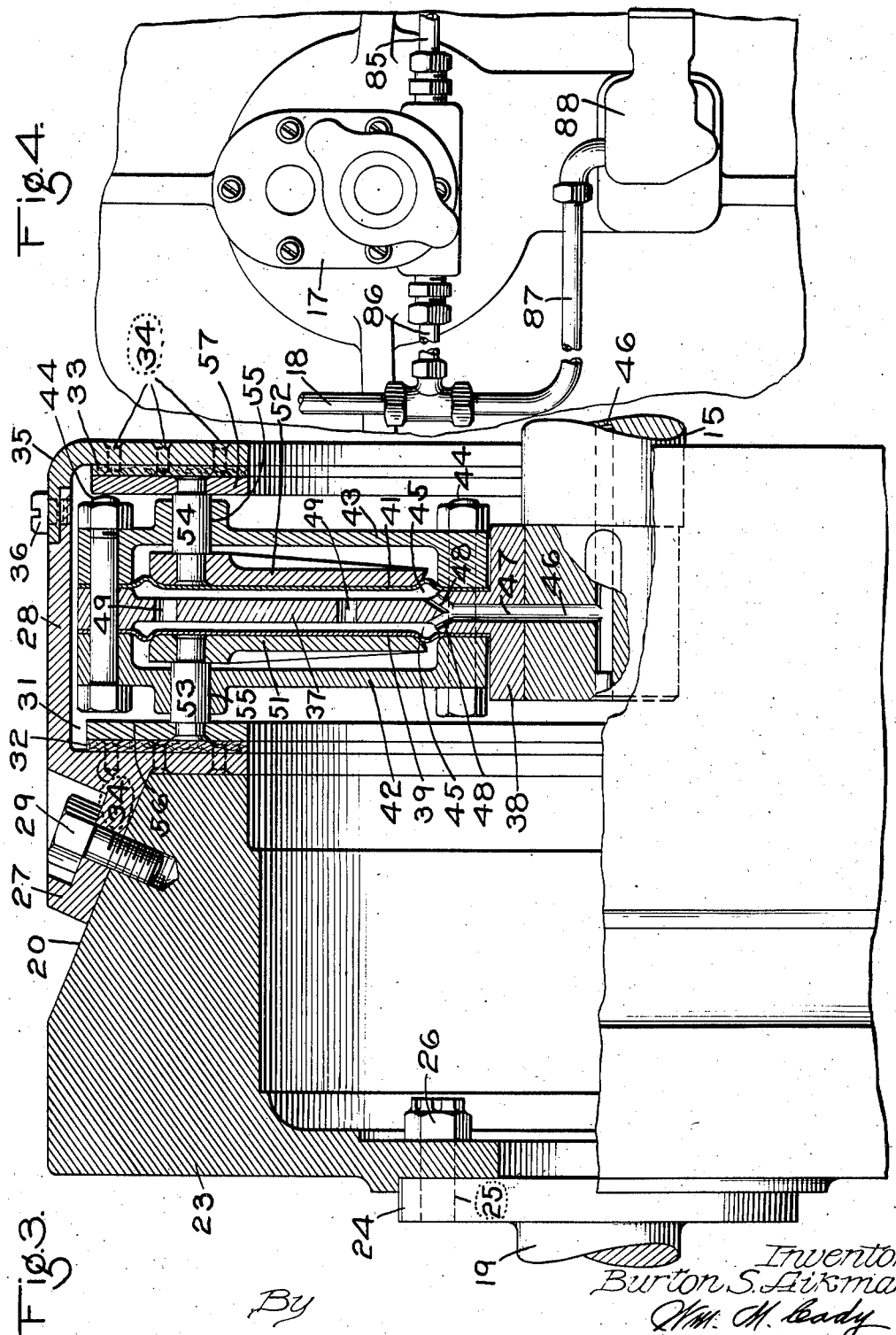

2,074,738

UNITED STATES PATENT OFFICE 2,074,738

CONTROL FOR COMPRESSORS AND THE LIKE

Burton S. Aikman, Wilkinsburg, Pa., assignor to The Westinghouse Air Brake Company, Wilmerding, Pa., a corporation of Pennsylvania Application July 30, 1932, Serial No. 626,504
Renewed August 6, 1935

45 Claims. (Cl. 230—15)

This invention relates to fluid compressor apparatus and particularly to the driving clutch mechanism for releasably connecting the compressor to a driving motor.

Whether a compressor is driven by an electric motor or an internal combustion motor, it is desirable to disconnect the compressor from the motor or to unload the compressor while starting the motor. A friction clutch is usually provided for releasably connecting the compressor to the motor where no unloader mechanism is provided on the compressor. In certain installations where the compression of fluid is not required continuously or for relatively long periods of time, while the motor continues to run, a releasable clutch device is found to be desirable in preference to an unloader device for the reason that the compressor during such intervals may remain stationary, thereby increasing the life of the moving parts.

Compressors are usually lubricated by a lubricant circulating system, including a pump driven by the compressor mechanism, and it is an object of this invention to provide a clutch device for releasably connecting the compressor to the motor and which is actuated by the fluid lubricant circulated in the lubricating system of the compressor, and which is so controlled thereby that the clutch is released upon a predetermined reduction in fluid lubricant pressure in the circulating system such as might be occasioned by failure of the circulating pump or stoppage in the circulating system.

A further object of the invention is to provide a fluid pressure actuated clutch and a fluid lubricant circulating system having the above noted characteristics, wherein the clutch is moved to connecting position by fluid lubricant under pressure when the fluid lubricant pressure in the lubricant circulating system of the compressor exceeds a predetermined value, and wherein the fluid pressure of the fluid lubricating system for the motor is utilized to initiate or develop pressure in the compressor lubricating system for actuating the clutch to connecting position when it is desired to connect the compressor to the motor.

A further object of the invention is to provide a clutch and lubricating system having the above noted characteristics, wherein the clutch is automatically controlled by a valve device responsive to variations in fluid pressure in the compressor lubricating system, and wherein the said valve device may be manually actuated to effect desired actuation of the clutch.

A further object of the invention is to provide a fluid actuated clutch device for releasably connecting a compressor or like apparatus to a motor, wherein the actuating fluid in the clutch is subjected, when the clutch is rotating, to centrifugal force which tends to increase the fluid pressure acting on the clutch and to increase its holding characteristics.

A further object of the invention is to provide a fluid pressure actuated clutch device and fluid pressure system therefor, wherein the fluid pressure acting on the clutch for retaining it in connecting position is caused to be suddenly reduced to effect release of the clutch, when the pressure of fluid acting on the clutch has been reduced to a predetermined value, which predetermined reduced value is still sufficient to retain the clutch in connecting position without slipping, thereby preventing an occurrence of a pressure condition within the clutch which would hold the clutch engaged but with insufficient pressure to prevent slipping.

These and other objects of the invention that will hereinafter appear throughout the further description thereof, are attained by the apparatus hereinafter described and illustrated in the accompanying drawings, wherein:

Fig. 1 is an elevational view of a compressor, motor, clutch device and clutch controlling valve device embodying features of the invention, the lubricant and pressure controlling valve mechanism being diagrammatically shown in longitudinal section;

Fig. 2 is a sectional view, partially in elevation, of the valve device shown in Fig. 1;

Fig. 3 is a sectional view, partially in elevation, of the improved clutch device shown in Fig. 1;

Fig. 4 is a fragmental end elevational view of one end of the compressor, showing the lubricant pump and pipe connection thereto.

Figure 5:
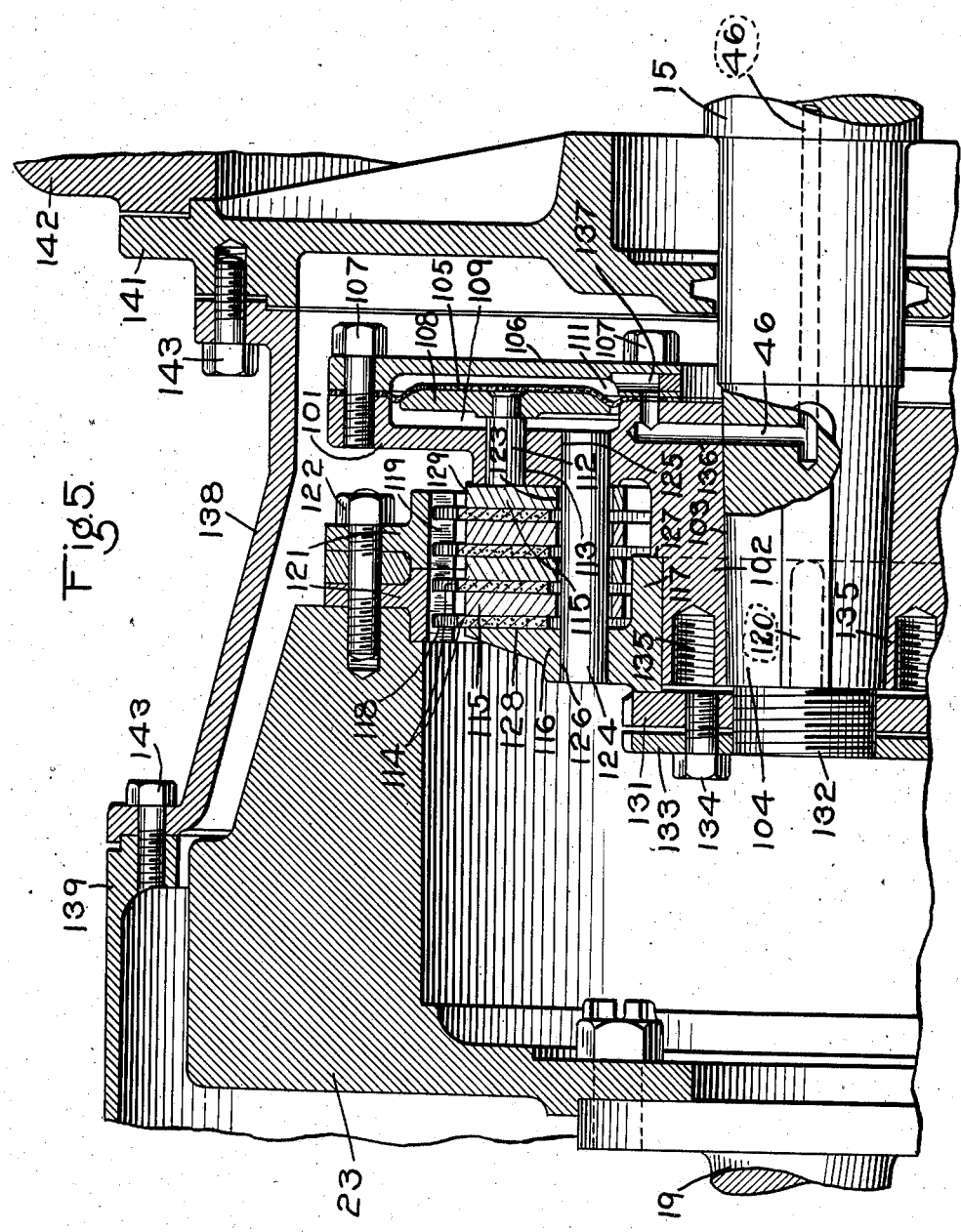
Fig. 5 is a fragmental sectional view of a modified form of clutch device.

Referring to the drawings, the apparatus includes a fluid compressor 11 of the reciprocating piston type, an internal combustion motor 12, a clutch 13 for releasably connecting the compressor to the motor and a clutch controlling valve device 14, operatively associated with the motor and compressor, as indicated in Fig. 1.

The fluid compressor may be of any desired type and is provided with a crank shaft 15 for operating the usual pistons (not shown) within the water jacketed cylinders 16. The crank shaft drives a lubricant pump 17, which serves to circulate lubricant through a system of conduits leading to the shaft bearings, piston rod bearings, and moving parts of the compressor. Fluid lubricant is also delivered to the clutch controlling valve device from the pump 17 through a conduit or pipe 18 for a purpose to be hereinafter described.

The motor may be of any preferred type and for the purpose of illustration, an internal combustion motor 12 is shown having a driving crank shaft 19 that is releasably connected to the compressor crank shaft by means of the clutch device 13. The motor is provided with a lubricant pump 21, that is driven by the crank shaft 19 through gearing (not shown) and, therefore, is actuated when the motor is operated, for circulating fluid lubricant through a system of conduits (not shown) leading to the crank shaft bearings, piston rod bearings and moving parts of the motor. Lubricant is also delivered from the pump 21 to the clutch controlling valve device 14 through a conduit or pipe 22 for a purpose to be hereinafter described.

Referring to Fig. 3, the clutch device is shown associated with the fly wheel 23 of the internal combustion motor, which is attached to the flange 24 on the end of the driving crank shaft 19 of the motor, by means of the usual bolts 25 that are secured in place by threaded nuts 26. The peripheral surface of the fly wheel 23 is provided with a tapered portion 20 for receiving a tapered flange 27 of an annular clutch housing 28, that is secured to the fly wheel by means of bolts 29. The clutch housing 28 is provided with a deep annular internal chamber 31 in which annular friction discs 32 and 33, preferably made of composition material, are secured to the sides of the chamber by means of countersunk rivets 34, as indicated in Fig. 3.

In order to facilitate assembly of the clutch parts, the housing 28 is made in two pieces, namely the flanged portion attached to the fly wheel 23, and the outer flanged portion 35 that is detachably connected to the body of the housing by means of threaded bolts 36, as indicated in Fig. 3.

A carrier disc 37, having a hub 38, is keyed to the compressor crank shaft 15, so that it rotates with the crank shaft. The carrier disc is disposed midway between the friction discs 32 and 33 and movable abutments, shown as annular flexible diaphragms 39 and 41, are clamped on the opposite sides of the disc 37 by means of annular guide plates 42 and 43, respectively, which are secured to the carrier disc by means of bolts 44. The diaphragms are preferably made of rubber composition or any material that will permit of a relatively great deflection without detrimentally affecting the life of the diaphragm. It has been found that diaphragms made of a plurality of thin metal sheets are also satisfactory for this purpose.

Annular chambers 45 are provided on opposite sides of the disc 37 between the disc and the inner faces of the diaphragms 39 and 41 for receiving fluid lubricant supplied thereto through a lubricant passage 46 in the compressor crank shaft 15, which registers with a passage 47 in the hub 38 of the disc 37 and which opens into the chambers 45 through branch passages 48. Communication is established between the chambers 45 by means of passages 49 extending through the disc 37 from one side thereof to the other and through the passages 48.

Annular follower plates 51 and 52 are mounted, respectively, on the diaphragms 39 and 41, and the plates are provided with pins 53 and 54, respectively, which slidably extend through guide openings 55 in the clamp plates 42 and 43. Clutch plates 56 and 57, preferably made of metal, are secured to the outer ends of the pins 53 and 54, respectively, and are adapted to be forced into frictional engagement with the friction discs 32 and 33, respectively, when the clutch plates are forced outwardly from the carrier disc 37 by the diaphragms 39 and 41 in response to an application of pressure to the fluid lubricant within the chambers 45 between the diaphragms. From the foregoing, it is apparent that when sufficient fluid pressure is applied to the inner faces of the diaphragms 39 and 41, the clutch plates 56 and 57 will be forced into driving engagement with the friction discs 32 and 33.

The clutch controlling valve device 14 comprises a casing 58 containing a motor lubricant valve chamber 59, a compressor lubricant valve chamber 61, and a piston chamber 62, the latter containing a piston 63 that is normally biased toward the left end of the chamber 62 by means of a spring 64, that is disposed between the face of the piston exposed to fluid under pressure in the compressor controlling valve chamber 61 and a wall 66 of the casing 58.

A motor lubricant valve 67 having a stem 70 is mounted in the valve chamber 59 and is adapted to engage valve seats 68 and 69, the valve being biased toward the seat 69 by means of a spring 71, disposed in a chamber 72 which is connected to the motor lubricant circulating pump 21 through the conduit or pipe 22. The chamber 59 opens into a chamber 73 through an opening 74, which is adapted to be closed by the valve 67 when seated upon the valve seat 69.

The chamber 73 is connected to the oil chamber sump pit 75 of the motor 12 by means of a conduit or pipe 76. The piston chamber 62 communicates with the valve chamber 59 through an extension thereof, as indicated in Fig. 1. When the valve 67 is in its closed position, as shown in Fig. 1, communication is established from the piston chamber 62 to the lubricant chamber sump pit 75 of the motor through valve chamber 59, opening 74, chamber 73, and pipe 76, thus permitting the spring 64 to force the piston 63 to the extreme left position shown in Fig. 1.

A compressor lubricant control valve 77, having a stem 78, is disposed within the valve chamber 61 and is adapted to engage a valve seat 79. The valve is normally retained in the open position shown in Fig. 1, by means of a spring 81 disposed in a chamber 82, which communicates with the lubricant chamber sump pit 83 of the compressor 11 through a conduit or pipe 84. The inner end of the stem 78 engages the inner end of the stem 70 of the valve 67 and since the spring 81 is stronger than the combined force of spring 71 and the fluid lubricant pressure in pipe 22 acting on the end of the valve 67, the valve 67 is normally retained in the closed position shown in Fig. 1. When the valve 77 is open, fluid lubricant under pressure is delivered from the pump 17 through the pipe 18 to the valve chamber 61, from whence it flows past the valve seat 79, chamber 82 and pipe 84 to the lubricant chamber sump pit 83 of the compressor. Since the passage just defined is relatively large in cross sectional area, substantially no pressure is developed in the valve chamber 61 when the valve 77 is open.

It will be understood that the pump 17 is driven by the compressor crank shaft and that the pump intake pipe 85, Fig. 4, is connected to the lubricant chamber sump pit 83 and to the pipe 84, as indicated in Figs. 1 and 4. The pump discharge pipe 86 is connected to the pipe 18 leading to the valve chamber 61 and to the pipe 87 leading to a distributing casing 88, to which a lubricant conduit 89 is connected for conducting lubricant to desired points in the compressor. A branch conduit 91 leads from the conduit 89 to a port 92 in the main bearing 93, which port registers with an annular groove 94 in the crank shaft 15 having a passage 95 leading from the groove to the passage 46, which extends lengthwise throughout the crank shaft. Consequently when the valve 77 is open, the lubricant is under practically no pressure in the passage 46, which is in communication with the chambers 45 of the clutch device. Under such conditions, the clutch discs 56 and 57 are released from driving connection with their respective discs 32 and 33.

In operation, assuming the motor to be running and that the valve 77 is in the open position and the valve 67 is in the closed position shown in Fig. 1, in which position the valves are normally yieldingly retained by the spring 81, and that the compressor is not running, the clutch 13 will, under such conditions, be in release position, because the lubricant in the compressor lubricating system and in the chambers 45 is then under statical pressure only.

In order to connect the compressor to the motor, the valve 77 is manually moved to closed position shown in Fig. 2, by means of the operating handle 96 that is attached to the valve stem 78. Closing of the valve 77 prevents the escape of lubricant from the valve chamber 61 through pipe 84 and consequently any pressure developed in the valve chamber 61 will be applied, through pipes 18 and 87, casing 88, pipes 89 and 91, groove 94 and passage 95, to the lubricant in passage 46 in the compressor crank shaft 15 and in the chambers 45 of the clutch device 13.

When the valve 77 is moved to closed position, the spring 71 forces the valve 67 to its right hand position, wherein the valve engages seat 69 and closes communication between the valve chamber 59 and the lubricant reservoir sump pit 75 of the motor. When the valve 67 is in the open position shown in Fig. 2, lubricant under pressure is forced by the lubricant pump 21 of the motor, through the pipe 22 and chamber 72 into the valve chamber 59 and from thence into the piston chamber 62. The strength of the spring 64 is just a little more than sufficient to return the piston 63 to its left hand position when no fluid pressure exists in chamber 62 and offers relatively little resistance to movement of the piston toward the right. Consequently the pressure of the lubricant acting on the left face of the piston 63, forces the piston to the right and thereby transmits pressure to the fluid in the valve chamber 61 practically equivalent to that applied upon the left face of the piston 63. Substantially the pressure developed in valve chamber 61 is transmitted to the lubricant in the passage 46 in the compressor crank shaft and the chambers 45 in the clutch device and the pressure thus developed in the clutch device is sufficient to force the clutch discs 56 and 57 into engagement with the clutch discs 32 and 33, and to thereby gradually start rotation of the compressor crank shaft without undue shock to the compressor or the motor.

When the compressor crank shaft is rotated by the motor, the pump 17, which is driven by the crank shaft, maintains, under normal operating conditions, sufficient fluid pressure in the compressor lubricating system to maintain driving engagement of the clutch discs 56 and 57 with the discs 32 and 33, respectively, and this fluid pressure is further augmented by the centrifugal force developed by the fluid contained in chambers 45, by reason of the rapid rotation of the clutch.

The motor and compressor will continue to rotate until the pressure of the lubricant in the chambers 45 of the clutch device is reduced sufficiently to permit the withdrawal of the clutch discs 56 and 57 from driving engagement with the discs 32 and 33, respectively.

In order to stop the compressor, the operating handle 96 of the valve 77 is forced toward the left, thereby unseating the valve 77 and seating the valve 67 on its seat 68. The pressure of the lubricant in the valve chamber 61 is immediately reduced, since the unseating of valve 77 opens the passage from the valve chamber 61 to the lubricant reservoir sump pit 83, through the chamber 82 and pipe 84. Seating of the valve 67 on its seat 68 opens communication from the valve chamber 59 to the lubricant reservoir sump pit 75 of the motor through opening 74, chamber 73, and the pipe 76, thereby reducing the pressure in chambers 59 and 62, and prevents further discharge of fluid from the pump 21 to the valve chamber 59 through the pipe 22 and to piston chamber 62. When the pressure in the chamber 62 acting on the left face of the piston 63 is thus relieved, the spring 64 forces the piston 63 to its left hand position shown in Fig. 1. The parts are then in position for a subsequent operation of the clutch.

In the event of excessive leakage in the compressor lubricating system or in the event of failure of the compressor pump or stoppage of the pump discharge pipe leading to the conduit 89 or to pipe 18, if the pressure in the valve chamber 61 should be reduced to a point where the pressure in the chambers 45, acting on the diaphragms 39 and 41, is insufficient to press the clutch discs 56 and 57 into proper driving engagement with their respective discs 32 and 33, slippage of the clutch discs will occur. Continuous slipping of the discs would eventually cause failure of the clutch. In order to guard against such a contingency, the spring 81 is so tensioned that when the fluid pressure within the valve chamber 61 and acting on the face of the valve 77 falls below a predetermined value, which value is greater than the pressure at which slippage of the clutch would occur, the spring 81 forces the valve 77 to the open position, as shown in Fig. 1, and relieves the pressure within the valve chamber 61 in the manner previously described. The sudden reduction in fluid lubricant pressure within the chambers 45 of the clutch device occasioned by the opening of the valve 77, will cause the clutch discs to automatically release and indicate to the operator that something is out of order in the lubricating system. Thus both the clutch and compressor are protected against failure of the lubricating system.

It is apparent from the foregoing that a fluid actuated clutch device is provided for connecting the motor to the compressor, which may be controlled manually or automatically in the event of failure of the lubricating system of the compressor.

In Fig. 5, a modified form of clutch device is illustrated, wherein a single annular diaphragm or abutment serves to force a plurality of clutch discs into frictional engagement when fluid lubricant under pressure is applied to one face of the diaphragm.

The modified form of clutch device is shown applied to the crank shaft 19 of an internal combustion motor having a fly wheel 23 secured thereto, as in the clutch device shown in Fig. 3.

The carrier disc 101, having a hub portion 102, is keyed upon the shaft 15 of the compressor. The hub 102 is provided with a tapered opening 103 for receiving the tapered end 104 of the shaft 15, and longitudinal displacement of the hub with respect to the shaft is prevented by a lock nut device to be hereinafter described.

A flexible diaphragm 105 preferably made of rubber composition, or other suitable material, is clamped upon one side of the carrier disc 101 by means of an annular clamping plate 106 that is secured to the carrier disc by means of bolts 107. An annular follower 108 is mounted within the chamber 109 and is secured to the diaphragm 105, so that when pressure is applied to the fluid lubricant within the chamber 111, the follower is moved leftward with a series of disc operating pins 112, one of which is shown, secured to the follower 108 and extending through guide opening 113 in the carrier disc 101.

A series of discs 114 and 115 are adapted to be clamped between the outer ends of the pins 112 and a supporting disc 116 having a hub portion 117 that is keyed upon the hub 102 by a key 120. The clutch discs 114 are adapted to turn with the fly wheel 23 and are provided with teeth 118, which engage teeth 119 that are formed integral with metal rings 121 which are secured to the fly wheel 23 by means of bolts 122. Additional discs 114 may be added and the capacity of the clutch increased by increasing the number of rings 121 sufficiently to accommodate the added discs 114 and 115.

The clutch discs 115 are adapted to rotate with the compressor crank shaft 15 and the carrier disc 101, and are provided with holes 123 through which a series of pins 124, one of which is shown, extend. The pins 124 fit snugly into alined openings 125 and 126 in the carrier disc 101 and the supporting disc 116, respectively.

The inner face of the hub 117 of the supporting disc 116 engages a shoulder 127 on the hub 102, so as to limit the inward movement of the supporting disc 116. Sufficient space is provided between the disc engaging face 128 of the supporting disc 116 and the disc engaging face 129 of the carrier disc 101 to permit slight separation of the discs 114 and 115, so that the fly wheel 23 may rotate without imparting movement to the carrier disc 101.

When pressure is applied to the lubricant within the chamber 111, the follower 108 is forced toward the left, so that the outer ends of the pins 112 are forced against the adjacent outer disc 115. The pressure applied to the outer disc 115 is transmitted to the discs 114 and 115 disposed between the supporting disc 116 and the outer clutch disc 115 engaged by the pins. The gradual application of pressures on the diaphragm 105 causes the clutch disc to gradually accelerate the crank shaft 15 until it is rotating at the same speed as the motor. Sufficient pressure is ordinarily applied to the clutch disc to prevent slipping of the discs while the clutch is in connecting position.

The supporting disc 116 is locked upon the shaft 15 by a threaded nut 131 which is threaded upon a threaded portion 132 of the shaft 15. The nut 131 is adapted to be locked in locking position by means of a relatively thin nut 133, that is adapted to be pinched upon the threaded portion 132 of the crank shaft by a threaded bolt 134, which tends to deflect one side of the nut 133 toward the nut 131. Tapped holes 135 are provided in the hub 102 for the insertion of a gear puller when it is desired to remove the carrier disc from the crank shaft 15.

Fluid lubricant under pressure is supplied to the chamber 111 through a passage 46 in the crank shaft 15 and a passage 136 in the hub 102 of the carrier disc 101 which registers with a passage 137 in the clamping plate 106.

The entire clutch assembly is protected by a flanged casing 138, which is secured to the motor housing 139 and to the end plate 141 of the compressor housing 142 by means of bolts 143. It will be noted that the mounting for the clutch disc 114 is such that the crank shaft 15 may be moved to the right and away from the fly wheel 23 by movement in the direction of the axis of the crank shaft, so that the clutch device may be readily disassembled for inspection and repairs. It will be understood that the clutch device just described and shown in Fig. 5 may be substituted for the type of clutch shown in Fig. 3 and may be controlled by the valve device disclosed in Fig. 1.

While the invention is disclosed as applied to an internal combustion motor and a compressor, it is obvious that the improved clutch and controlling mechanism is applicable to any form of apparatus having driving shafts which are to be releasably connected and that changes, additions and omissions may be made in the construction of the clutch and the control mechanism therefor without departing from the spirit of the invention.

Having now described my invention, what I claim as new and desire to secure by Letters Patent, is:

1. The combination with a motor, a pump for circulating a fluid lubricant actuated thereby, a compressor, a pump for circulating a fluid lubricant actuated by the compressor and a fluid actuated clutch for releasably connecting said motor to said compressor, of means for supplying lubricant under pressure from said pump actuated by said compressor to said clutch for maintaining said clutch in connecting position, means for subjecting said lubricant acting on said clutch to pressure of the lubricant circulated by said pump actuated by said motor, and manually operable means for controlling the last said means.

2. The combination with a motor, a pump for circulating a fluid lubricant actuated thereby, a compressor, a pump for circulating a fluid lubricant actuated by the compressor and a fluid actuated clutch for releasably connecting said motor to said compressor, of means for supplying lubricant under pressure from said pump actuated by said compressor to said clutch for maintaining said clutch in connecting position, and means for subjecting said lubricant acting on said clutch to pressure of the lubricant circulated by said pump actuated by said motor.

3. The combination with a motor, a pump for circulating a fluid lubricant actuated thereby, a compressor, a pump for circulating a fluid lubricant actuated by the compressor and a fluid actuated clutch for releasably connecting said motor to said compressor, of means for supplying lubricant under pressure from said pump actuated by said compressor to said clutch for maintaining said clutch in connecting position, means for subjecting said lubricant acting on said clutch to pressure of the lubricant circulated by the pump actuated by said motor, and means for rendering the last said means ineffective to subject said lubricant acting on said clutch to pressure of the lubricant circulated by the pump actuated by said motor.

4. The combination with a motor, a compressor, a pump for circulating a fluid lubricant actuated by the compressor and a fluid actuated clutch for releasably connecting the motor to said compressor, of a means for supplying lubricant under pressure from said pump to said clutch for maintaining said clutch in connecting position.

5. The combination with a motor, a compressor, a pump for circulating a fluid lubricant actuated by the compressor and a fluid actuated clutch for releasably connecting the motor to said compressor, of a means for supplying lubricant under pressure from said pump to said clutch for maintaining said clutch in connecting position, the said clutch being adapted to release when the pressure of fluid acting on said clutch falls below a predetermined value.

6. The combination with a motor, a compressor, a pump for circulating a fluid lubricant actuated by the compressor and a fluid actuated clutch for releasably connecting the motor to said compressor, of a means for supplying lubricant under pressure from said pump to said clutch for maintaining said clutch in connecting position, the said clutch being adapted to release when the pressure of fluid acting on said clutch falls below a predetermined value, and fluid pressure responsive means for effecting a reduction in the pressure of the lubricant acting on said clutch below said predetermined value, when the pressure of the last said lubricant falls below a predetermined value greater than the first said predetermined value.

7. The combination with a motor, a compressor, a pump for circulating a fluid lubricant actuated by the compressor and a fluid actuated clutch for releasably connecting the motor to said compressor, of a means for supplying lubricant under pressure from said pump to said clutch for maintaining said clutch in connecting position, the said clutch being adapted to release when the pressure of fluid acting on said clutch falls below a predetermined value, and fluid pressure responsive means for effecting a reduction in the pressure of the lubricant acting on said clutch below said predetermined value, when the pressure of the last said lubricant falls below a predetermined value greater than the first said predetermined value, the fluid pressure responsive means being manually operable to effect a reduction in the pressure of the last said lubricant.

8. The combination with a motor, a compressor, a pump for circulating a fluid lubricant actuated by the compressor and a fluid actuated clutch for releasably connecting the motor to said compressor, of a means for supplying lubricant under pressure from said pump to said clutch for maintaining said clutch in connecting position, the said clutch being adapted to release when the pressure of fluid acting on said clutch falls below a predetermined value, and manually operable means for effecting a reduction in the pressure of the lubricant acting on said clutch below said predetermined value.

9. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, and means for supplying fluid lubricant under pressure from the first said system to said abutment for subjecting the fluid lubricant of the second said system to pressure of the fluid lubricant of the first said system acting on said abutment for effecting a movement of said clutch to its connecting position.

10. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a pressure responsive valve in the second said system for reducing the fluid pressure of the lubricant acting on said clutch for effecting its release when the pressure of the lubricant in the second said system falls below a predetermined value.

11. The combination with a motor, a conduit system, a pump driven by said motor for circulating a fluid lubricant under pressure through said system, a compressor, a second conduit system, a second pump driven by said compressor for circulating a fluid lubricant through said second system and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a manually operable valve in the second said system for reducing the fluid pressure of the lubricant acting on said clutch for effecting its release.

12. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a manually operable and fluid pressure responsive valve in the second said system for reducing the fluid pressure of the lubricant acting on said clutch for effecting its release.

13. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a valve in the first said system for controlling the supply of fluid lubricant under pressure to said abutment.

14. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a manually operable fluid pressure responsive valve in the first said system for controlling the supply of fluid lubricant under pressure to said abutment.

15. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, and a valve in the first said system responsive to variations in fluid pressure in the second said system for controlling the supply of fluid lubricant under pressure to said abutment.

16. The combination with a motor, a conduit system, a pump driven by said motor for circulating a fluid lubricant under pressure through said system, a compressor, a second conduit system, a second pump driven by said compressor for circulating a fluid lubricant through said second system, and a normally released fluid actuated clutch for releasably connecting said motor to said compressor, of means for supplying fluid lubricant under pressure from said second system to said clutch for maintaining said clutch in connecting position, a movable abutment in the second system, means for supplying fluid lubricant under pressure from the first said system to said abutment for subjecting the fluid lubricant of the second said system to pressure of the fluid lubricant of the first said system acting on said abutment for effecting a movement of said clutch to its connecting position, a valve in the second said system for reducing the pressure of the lubricant acting on said clutch, and a valve in the first said system for controlling the supply of fluid lubricant to said abutment, the said valves being simultaneously operable manually and operable automatically in response to variations in fluid pressure in the said second system.

17. The combination with a fluid compressor and a motor for driving the compressor, of a clutch mechanism operated by fluid under pressure for operatively connecting said motor with said compressor, and means operated by lubricant under pressure for subjecting said clutch mechanism to fluid under pressure.

18. The combination with a fluid compressor and a motor for driving the compressor, of a clutch mechanism operated by fluid under pressure for operatively connecting said motor with said compressor, means for supplying lubricant under pressure to said motor, and means operated by said lubricant under pressure for subjecting said clutch mechanism to fluid under pressure.

19. The combination with a fluid compressor and a motor for driving the compressor, of a clutch mechanism operated by fluid under pressure for operatively connecting said motor with said compressor, a pump for pumping lubricant to the motor, and means operated by the pressure of lubricant pumped for subjecting said clutch mechanism to fluid under pressure.

20. The combination with a driving member, a driven member and a fluid actuated clutch for releasably connecting the driving member to said driven member, said clutch being normally in release position and adapted to be actuated to connecting position when the fluid acting thereon is subjected to pressure, of means actuated by the driven member for subjecting said fluid acting on said clutch to pressure for maintaining said clutch in connecting position while the driven member is being driven.

21. The combination with a driving member, a driven member and a fluid actuated clutch for releasably connecting the driving member to said driven member, said clutch being normally in release position and adapted to be actuated to connecting position when the fluid acting thereon is subjected to pressure, of means actuated by the driven member for subjecting said fluid acting on said clutch to pressure for maintaining said clutch in connecting position while the driven member is being driven, the said clutch being adapted to release when said pressure of the fluid acting thereon falls below a predetermined value, and a pressure responsive means for effecting a reduction in pressure of the fluid acting on said clutch below said predetermined value when the pressure of the fluid acting on said clutch falls below a predetermined value greater than the first said predetermined value.

22. The combination with a driving member, a driven member and a fluid actuated clutch for releasably connecting the driving member to said driven member, said clutch being normally in release position and adapted to be actuated to connecting position when the fluid acting thereon is subject to pressure, of means actuated by the driven member for subjecting said fluid acting on said clutch to pressure for maintaining said clutch in connecting position while the driven member is being driven, the said clutch being adapted to release when said pressure of the fluid acting thereon falls below a predetermined value, and a manually operable means for effecting a reduction in pressure of the fluid acting on said clutch below said predetermined value to effect release of said clutch.

23. The combination with a driving member and a driven member, of a movable abutment secured to one member subject on one side to fluid under pressure and carrying a friction shoe, a friction member carried on the other member and adapted to cooperate with said friction shoe for effecting a driving connection between said members, means driven by one of said members for supplying fluid under pressure to said abutment, and means responsive to variations in fluid pressure for reducing the pressure of the fluid acting on the abutment so as to release said shoe from driving relation with said friction member.

24. The combination with a machine having an operating shaft having a passage therein for conducting a fluid lubricant to relatively moving contacting parts of said machine, of a fluid actuated driving clutch carried by said shaft and subjected to fluid lubricant under pressure supplied through said passage in the shaft.

25. The combination with a machine having an operating shaft having a passage therein for conducting a fluid lubricant to relatively moving contacting parts of said machine and a pump driven by said machine for forcing lubricant through said passage, of a fluid actuated driving clutch carried by said shaft and subjected to fluid lubricant under pressure supplied through said passage in the shaft.

26. The combination with a driving member, a driven member and a fluid actuated clutch for releasably connecting the driving member to said driven member, of fluid pressure actuated means for subjecting the fluid acting on said clutch to pressure for actuating said clutch, and means driven by said driving member for supplying fluid under pressure to actuate said fluid pressure actuated means.

27. The combination with a driving member, a driven member and a fluid actuated clutch for releasably connecting the driving member to said driven member, of fluid pressure actuated means for subjecting the fluid acting on said clutch to pressure for actuating said clutch, and means for rendering said fluid pressure actuated means effective or ineffective to subject said fluid to pressure.

28. The combination with a driving member, a driven member and a fluid actuated clutch for releasably connecting the driving member to the driven member, of fluid actuated means for subjecting the fluid acting on said clutch to pressure for actuating said clutch, means driven by the driving member for subjecting fluid acting on said fluid actuated means to pressure for actuating said clutch, and means driven by said driven member for subjecting the fluid acting on said clutch to pressure for maintaining the clutch in actuated position connecting the driving member and the driven member.

29. The combination with a driving member, a driven member and a fluid actuated clutch for releasably connecting the driving member to the driven member, of fluid actuated means for subjecting the fluid acting on said clutch to pressure for actuating said clutch, means driven by the driving means for supplying fluid under pressure to said fluid actuated means to actuate it, and means for controlling the delivery of fluid under pressure to said fluid actuated means.

30. The combination with a driving member, a driven member and a fluid actuated clutch for releasably connecting the driving member to said driven member, said clutch, being normally in release position and adapted to be actuated to connecting position when the fluid acting thereon is subjected to pressure, of means actuated by the driving member for subjecting said fluid acting on said clutch to pressure for actuating said clutch to connecting position, and means actuated by the driven member for subjecting said fluid acting on said clutch to pressure for maintaining said clutch in connecting position while the driven member is being driven.

31. The combination with a driving member, a driven member and a fluid actuated clutch for releasably connecting the driving member to said driven member, said clutch being normally in release position and adapted to be actuated to connecting position when the fluid acting thereon is subjected to pressure, of means actuated by the driving member for subjecting said fluid acting on said clutch to pressure for actuating said clutch to connecting position, means for rendering the last said means effective or ineffective to subject said fluid to pressure, and means actuated by the driven member for subjecting said fluid acting on said clutch to pressure for maintaining said clutch in connecting position while the driven member is being driven.

32. The combination with a driving member, a driven member and a fluid actuated clutch for releasably connecting the driving member to said driven member, said clutch being normally in release position and adapted to be actuated to connecting position when the fluid acting thereon is subjected to pressure, of means actuated by the driving member for subjecting said fluid acting on said clutch to pressure for actuating said clutch to connecting position, manually operable means for rendering the last said means effective or ineffective to subject said fluid to pressure, and means actuated by the driven member for subjecting said fluid acting on said clutch to pressure for maintaining said clutch in connecting position while the driven member is being driven.

33. The combination with a driving member, a driven member and a fluid actuated clutch for releasably connecting the driving member to said driven member, said clutch being normally in release position and adapted to be actuated to connecting position when the fluid acting thereon is subjected to pressure, of means actuated by the driving member for subjecting said fluid acting on said clutch to pressure for actuating said clutch to connecting position, means actuated by the driven member for subjecting said fluid acting on said clutch to pressure for maintaining said clutch in connecting position while the driven member is being driven, the said clutch being adapted to release when said pressure of the fluid acting thereon falls below a predetermined value, a pressure responsive means for effecting a reduction in pressure of the fluid acting on said clutch below said predetermined value when the pressure of the fluid acting on said clutch falls below a predetermined value greater than the first said predetermined value, and a manually operable means for rendering said means actuated by the driving member effective to subject the fluid acting on said clutch to pressure above the second said predetermined value for actuating said clutch to connecting position.

34. In combination, a driving member, a driven member, a fluid pressure actuated clutch device adapted upon an increase in the pressure of the fluid acting thereon to be actuated to a position for connecting said driving member to said driven member in driving relation, fluid pressure responsive means operative to so increase the pressure of the fluid acting on said clutch device as to actuate it to connecting position, and means effective when said driven member is being driven, for maintaining sufficient pressure of the fluid acting on the clutch device to cause the clutch device to remain in connecting position.

35. In combination, a driving member, a driven member, a fluid pressure actuated clutch device adapted upon an increase in the pressure of the fluid acting thereon to be actuated to a position for connecting said driving member to said driven member in driving relation, fluid pressure responsive means operative to so increase the pressure of the fluid acting on said clutch device as to actuate it to connecting position, means effective, when said driving member is operating, to cause operation of said fluid pressure responsive means, and means effective when said driven member is being driven, for maintaining sufficient pressure of the fluid acting on the clutch device to cause the clutch device to remain in connecting position.

36. In combination, a driving member, a driven member, a fluid pressure actuated clutch device adapted upon an increase in the pressure of the fluid acting thereon to be actuated to a position for connecting said driving member to said driven member in driving relation, means effective when said driving member is operating, to cause an increase in the pressure of the fluid acting on said clutch device resulting in actuation thereof to connecting position, and means effective when said driven member is being driven, for maintaining sufficient pressure of the fluid acting on the clutch device to cause the clutch device to remain in connecting position.

37. In combination, a driving member, a driven member, a fluid pressure actuated clutch device adapted upon an increase in the pressure of the fluid acting thereon to be actuated to a position for connecting said driving member to said driven member in driving relation, fluid actuated means for subjecting the fluid acting on said clutch device to pressure for actuating the clutch device to connecting position, and means operated by said driven member, while being driven, for subjecting the fluid acting on the said clutch device to pressure for maintaining the said clutch device in connecting position.

38. In combination, a driving member, a driven member, a fluid pressure actuated clutch device adapted upon an increase in the pressure of the fluid acting theron to be actuated to a position for connecting said driving member to said driven member in driving relation, fluid actuated means for subjecting the fluid acting on said clutch device to pressure for actuating the clutch device to connecting position, means operated by said driving member for effecting the actuation of said fluid actuated means, and means operated by said driven member, while being driven, for subjecting the fluid acting on the said clutch device to pressure for maintaining the said clutch device in connecting position.

39. In combination, a driving member, a driven member, a fluid pressure actuated clutch device adapted upon an increase in the pressure of the fluid acting thereon to be actuated to a position for connecting said driving member to said driven member in driving relation, means operated by said driving member adapted to increase the pressure of the fluid acting on said clutch device to cause it to be actuated to connecting position, and means operated by said driven member adapted to maintain sufficient pressure of the fluid acting on said clutch device to maintain the clutch device in connecting position.

40. In combination, a driving member, a driven member, a fluid pressure actuated clutch device adapted upon an increase in the pressure of the fluid acting thereon to be actuated to a position for connecting said driving member to said driven member in driving relation, fluid pressure responsive means operative to so increase the pressure of the fluid acting on said clutch device as to actuate it to connecting position, and means effective while said driven member is being driven, for maintaining sufficient pressure of the fluid acting on the clutch device to cause the clutch device to remain in connecting position, independently of said fluid pressure responsive means.

41. In combination, a driving member, a driven member, a fluid pressure actuated clutch device adapted upon an increase in the pressure of the fluid acting thereon to be actuated to a position for connecting said driving member to said driven member in driving relation, fluid pressure responsive means operative to so increase the pressure of the fluid acting on said clutch device as to actuate it to connecting position, means effective, when said driving member is operating, to cause operation of said fluid pressure responsive means, and means effective while said driven member is being driven, for maintaining sufficient pressure of the fluid acting on the clutch device to cause the clutch device to remain in connecting position, independently of said fluid pressure responsive means.

42. In combination, a driving member, a driven member, a fluid pressure system adapted to have fluid therein subjected to pressure by operation of said driving member, a fluid pressure system adapted to have fluid therein subjected to pressure by operation of said driven member, a clutch device subject to the fluid in the second said fluid pressure system and adapted upon an increase in the pressure of the fluid in the second said fluid pressure system to be actuated to a position for connecting said driving member to said driven member in driving relation, and means responsive to the pressure of the fluid in the first said fluid pressure system for subjecting the fluid in the second said system to pressure for actuating said clutch device to connecting position, said clutch device being maintained in connecting position by the pressure of the fluid developed in said second fluid pressure system by operation of said driven member.

43. In combination, a driving member, a driven member, a fluid pressure actuated clutch device adapted upon an increase in the pressure of the fluid acting thereon to be actuated into a position for connecting said driving member to said driven member in driving relation, fluid pressure actuated means adapted to be actuated to subject the fluid acting on said clutch device to pressure for effecting the actuation of the clutch device into connecting position, manually operable means for effecting the actuation of said fluid pressure actuated means, pumping means operated by the driven member, and fluid pressure responsive means conditioned by operation of said manually operable means to render the said pumping means effective to subject the fluid acting on said clutch device to pressure for maintaining the clutch device in connecting position, and effective upon a reduction in the pressure of the fluid acting on the clutch device insufficient to cause said clutch device to move out of connecting position, to suddenly further reduce the pressure of the fluid acting on said clutch device to positively effect movement of the clutch device out of connecting position.

44. In combination, a rotatable driving member, a rotatable driven member, a clutch member carried on the driving member, a clutch member carried on the driven member, a movable abutment rotatable with said driven member for moving the clutch member carried on said driven member into cooperative relation with the other clutch member to connect the driving member to the driven member in driving relation, said abutment being subject on one side to a body of fluid rotatable therewith, and means for subjecting said body of fluid to pressure for initially actuating the abutment to move the clutch member on the said one rotatable member into cooperative relation with the other clutch member, said body of fluid being subjected to centrifugal force for generating pressure in the fluid to act on the abutment and aid in maintaining the said clutch members in cooperative relation.

45. The combination with a driving member, a driven member, a pump for circulating a fluid lubricant actuated by the driven member and a fluid actuated clutch for releasably connecting the driving member to said driven member, of a means for supplying lubricant under pressure from said pump to said clutch for maintaining said clutch in connecting position, the said clutch being adapted to release when the pressure of fluid acting on said clutch falls below a predetermined value.

BURTON S. AIKMAN.